(12) United States Patent
Jung et al.

(10) Patent No.: US 12,388,343 B2
(45) Date of Patent: Aug. 12, 2025

(54) BRIDGELESS POWER FACTOR-IMPROVING CONVERTER

(71) Applicant: LG INNOTEK CO., LTD., Seoul (KR)

(72) Inventors: Kwang Soon Jung, Seoul (KR); Seung Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 271 days.

(21) Appl. No.: 18/025,450

(22) PCT Filed: Sep. 10, 2021

(86) PCT No.: PCT/KR2021/012333
§ 371 (c)(1),
(2) Date: Mar. 9, 2023

(87) PCT Pub. No.: WO2022/055292
PCT Pub. Date: Mar. 17, 2022

(65) Prior Publication Data
US 2023/0327544 A1 Oct. 12, 2023

(30) Foreign Application Priority Data
Sep. 10, 2020 (KR) ........................ 10-2020-0115967

(51) Int. Cl.
*H02M 1/08* (2006.01)
*H02M 1/00* (2006.01)
(Continued)

(52) U.S. Cl.
CPC ........... *H02M 1/0006* (2021.05); *H02M 1/08* (2013.01); *H02M 1/4208* (2013.01);
(Continued)

(58) Field of Classification Search
CPC .... H02M 1/42; H02M 1/4208; H02M 1/4225; H02M 1/4233; H02M 7/217
See application file for complete search history.

(56) References Cited

U.S. PATENT DOCUMENTS 8,199,541 B2 6/2012 Yang
9,252,654 B1 * 2/2016 Tomioka ............. H02M 1/4225
(Continued)

FOREIGN PATENT DOCUMENTS

KR 10-1406476 6/2014
KR 10-1465129 11/2014

OTHER PUBLICATIONS

International Search Report dated Dec. 21, 2021 issued in Application No. PCT/KR2021/012333.

*Primary Examiner* — Gary L Laxton
(74) *Attorney, Agent, or Firm* — KED & ASSOCIATES, LLP

(57) ABSTRACT

A bridgeless power factor-improving converter according to one embodiment of the present invention comprises: a power input unit for receiving power; a first rectifying unit and a second rectifying unit for rectifying the received power; and a power factor-improving switch unit that is connected to the first rectifying unit and the second rectifying unit and improves a power factor according to an on/off operation. The second rectifying unit includes a second upper switch and a second lower switch, wherein the second upper switch is driven by being connected to a driving power source of the power factor-improving switch unit.

20 Claims, 15 Drawing Sheets

(51) Int. Cl.
*H02M 1/42* (2007.01)
*H02M 7/217* (2006.01)
(52) U.S. Cl.
CPC ....... *H02M 1/4225* (2013.01); *H02M 1/4233* (2013.01); *H02M 7/217* (2013.01)

(56) References Cited

U.S. PATENT DOCUMENTS

| | | | | |
|---|---|---|---|---|
| 2007/0279955 A1* | 12/2007 | Liu | ..................... | H02M 1/4225 363/125 |
| 2010/0046264 A1* | 2/2010 | Ho | ...................... | H03K 17/302 363/127 |
| 2010/0259957 A1* | 10/2010 | Jin | ..................... | H02M 1/4208 363/126 |
| 2015/0280548 A1* | 10/2015 | Shoyama | ............ | H02M 1/4225 363/126 |
| 2021/0167695 A1* | 6/2021 | Yamakawa | ......... | H02M 1/0006 |

* cited by examiner

BRIDGELESS POWER FACTOR-IMPROVING CONVERTER

CROSS-REFERENCE TO RELATED PATENT APPLICATIONS

This application is a U.S. National Stage Application under 35 U.S.C. § 371 of PCT Application No. PCT/KR2021/012333, filed Sep. 10, 2021, which claims priority to Korean Patent Application No. 10-2020-0115967, filed Sep. 10, 2020, whose entire disclosures are hereby incorporated by reference.

TECHNICAL FIELD

The present invention relates to a bridgeless power factor-improving converter, and more particularly, to a bridgeless power factor-improving converter being driven by a small driving power source.

BACKGROUND ART

In the case of a converter that converts input power, the phases of the voltage and current do not match due to the rectifier diodes, capacitors, and the like in the circuit of the converter, thereby degrading the power factor. To solve this problem, the power factor can be improved by using a device such as a capacitor, and recently, the waveform of the current is changed while controlling the current through a converter between the AC power supply and the load.

Among various topologies, the power factor can be corrected by controlling the magnitude and phase of the current using a full bridge. The PFC topology can be applied in various ways depending on the use and purpose, such as a buck converter and a boost converter, but the boost converter for power factor improvement has limitations in securing high efficiency, so a bridgeless power factor-improving converter that does not require a bridge diode is used, but since the bridgeless power factor-improving converter has a switch that is not located at a lower side thereof, there is a problem in that the switch driving unit of the boost converter for power factor improvement cannot be used as it is.

DETAILED DESCRIPTION OF THE INVENTION

Technical Subject

A technical problem to be solved by the present invention is to provide a bridgeless power factor-improving converter being driven by a small driving power source.

Technical Solution

In order to solve the above technical problem, a bridgeless power factor-improving converter according to one embodiment of the present invention comprises: a power input unit for receiving a power; a first rectifying unit and a second rectifying unit for rectifying the power being received; and a power factor-improving switch unit being connected to the first rectifying unit and the second rectifying unit and improving a power factor according to an on/off operation, wherein the second rectifying unit includes a second upper switch and a second lower switch, and wherein the second upper switch is driven by being connected to a driving power source of the power factor-improving switch unit.

In addition, a first switch driving unit for driving the power factor-improving switch unit; a second switch driving unit for driving the second upper switch; and a third switch driving unit for driving the second lower switch are included, wherein the second switch driving unit may receive a power from a driving power source of the first switch driving unit.

In addition, the second switch driving unit may include a control unit for controlling the gate voltage of the second upper switch; and a bootstrap circuit unit for receiving a driving power from a driving power source of the first switch driving unit and supplying the power to the control unit.

In addition, the bootstrap circuit unit may include a diode and a capacitor being connected to a driving power source of the first switch driving unit.

In addition, one end of the capacitor of the bootstrap circuit unit is connected to the control unit and the other end is connected to the source of the MOSFET switch, which is the second upper switch; and the anode of the diode of the bootstrap circuit unit is connected to the driving power source of the first switch driving unit and the cathode may be connected to a node between the capacitor and the control unit.

In addition, the power factor-improving switch unit may include two MOSFET switches whose sources are connected to each other.

In addition, the sources of the two MOSFET switches of the power factor-improving switch unit may be connected to the driving power source of the power factor-improving switch unit.

In addition, the first rectifying unit includes an upper diode and a lower diode, wherein one end of the power factor-improving switch unit is connected to a node between the upper diode and the lower diode and the other end may be connected to a node between the second upper switch and the second lower switch.

In addition, the power input unit may receive AC power or DC power.

In addition, the power input unit may include an inductor.

In addition, an output capacitor being connected to the output ends of the first rectifying unit and the second rectifying unit may be included.

In order to solve the above technical problem, a bridgeless power factor-improving converter according to another embodiment of the present invention comprises: a power input unit for receiving power; a first rectifying unit and a second rectifying unit for rectifying the input power; and a power factor-improving switch unit being connected to the first rectifying unit and the second rectifying unit and improving the power factor according to the on/off operation, wherein the first rectifying unit includes a first upper switch and a first lower switch, wherein the second rectifying unit includes a second upper switch and a second lower switch, and wherein the first upper switch and the second upper switch are connected to and driven by a driving power source of the power factor-improving switch unit.

In addition, the first lower switch can be driven by being connected to the driving power source of the second lower switch.

In order to solve the above technical problem, a bridgeless power factor-improving converter according to another embodiment of the present invention comprises: a power input unit for receiving power; a first rectifying unit and a second rectifying unit for rectifying the input power; and a power factor-improving switch unit being connected to the first rectifying unit and the second rectifying unit and improving the power factor according to an on/off operation, wherein the first rectifying unit includes a first upper switch and a first lower switch, and wherein the first upper switch is driven by being connected to a driving power source of the power factor-improving switch unit.

Advantageous Effects

According to embodiments of the present invention, switches of a bridgeless power factor-improving converter can be driven with a small number of driving power sources. In addition, it is possible to drive the rectifying unit with line frequency or even when DC power is applied. Furthermore, the driving circuit can be implemented with a capacitor of a small capacitance.

BEST MODE

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Figure 1:
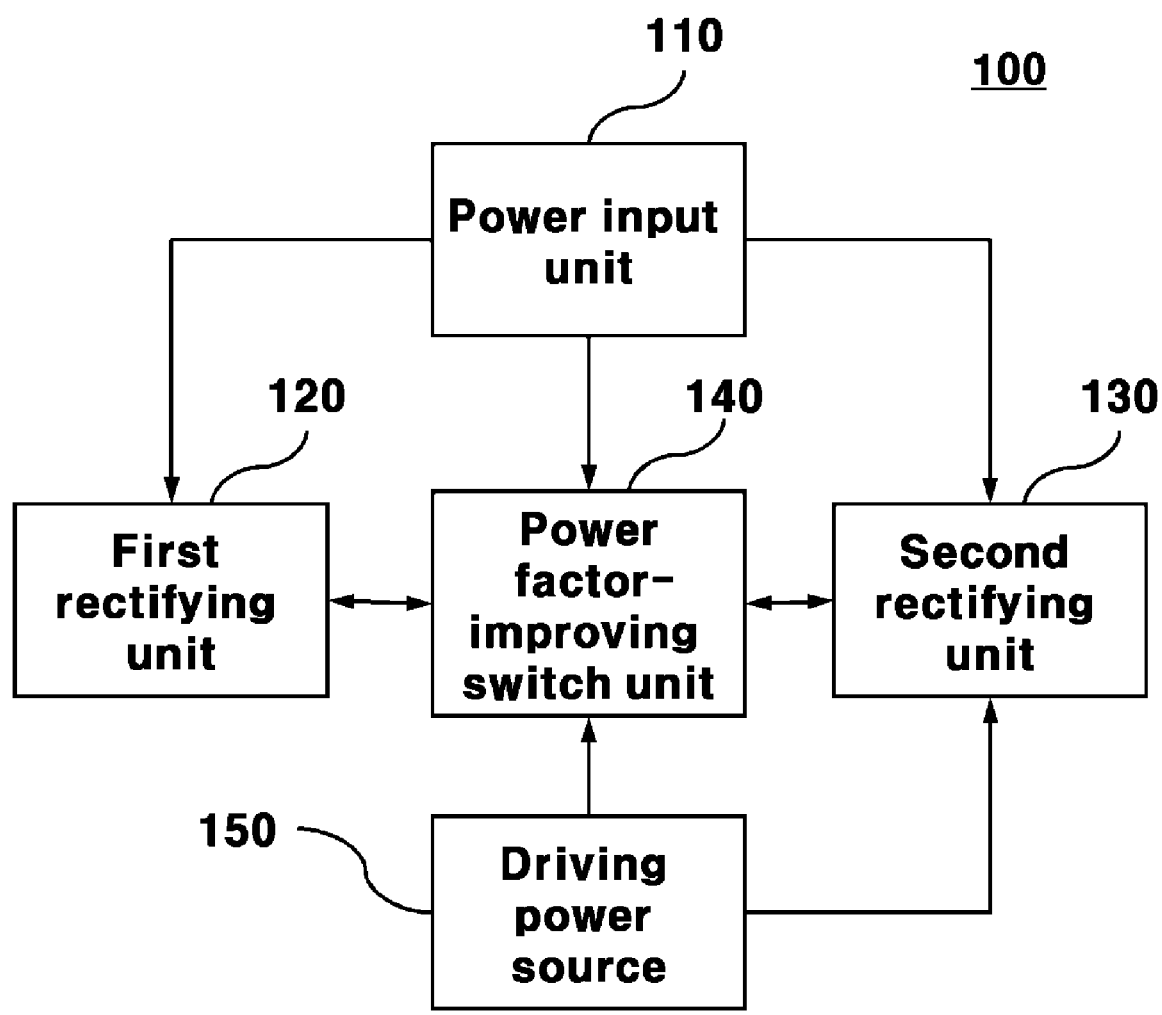
FIG. 1 is a block diagram of a bridgeless power factor-improving converter according to an embodiment of the present invention.

FIG. 1 is a block diagram of a bridgeless power factor-improving converter according to an embodiment of the present invention.

The bridgeless power factor-improving converter 100 according to an embodiment of the present invention comprises: a power input unit 110, a first rectifying unit 120, a second rectifying unit 130, and a power factor-improving switch unit 140, and may further includes a switch driving unit (not shown) and a driving power source 150 for driving the switch included in the bridgeless power factor-improving converter 100.

The power input unit 110 receives power. Here, the power input unit 110 may receive AC power or DC power. The input power is rectified through the first rectifying unit 120, the second rectifying unit 130, and the power factor-improving switch unit 140, and the power factor is improved.

The first rectifying unit 120 rectifies the input power being inputted. The first rectifying unit 120 is composed of an upper diode and a lower diode and can rectify the input power that has been received. Or, the first rectifying unit 120 may rectify the input power that has been received by using a switch instead of a diode. The upper diode and the lower diode may be connected to the power input unit 110 in parallel.

The second rectifying unit 130 rectifies power being outputted from the bridgeless power factor-improving converter 100. The second rectifying unit 130 may include a second upper switch and a second lower switch. The second upper switch and the second lower switch may be connected to the (−) terminal of the power input unit 110 in parallel. The second upper switch of the second rectifying unit 130 is driven by being connected to a driving power source 150 included in a switch driving unit that drives the power factor-improving switch unit 140. When driving each switch, a driving power source that is connected to each of the corresponding switches and can supply power is required, and in driving the second upper switch, the number of driving power sources for driving the switch can be reduced by using the driving power source 150 included in the switch driving unit that drives the power factor-improving switch unit 140 together.

The power factor-improving switch unit 140 is connected to the first rectifying unit 120 and the second rectifying unit 130 to improve the power factor according to an on/off operation. The power factor-improving switch unit 140 has one end connected to a node between the upper diode and the lower diode of the first rectifying unit 120, and the other end is connected to a node between the second upper switch and the second lower switch of the second rectifying unit 130 to improve the power factor through an on/off operation. A specific process of improving the power factor will be described in detail later.

FIGS. 2 to 9 illustrate comparative examples of bridgeless power factor-improving converters according to embodiments of the present invention. Although described as a comparative example, it is natural that the bridgeless power factor-improving converter according to the embodiment of the present invention may also include some configurations.

Figure 2:
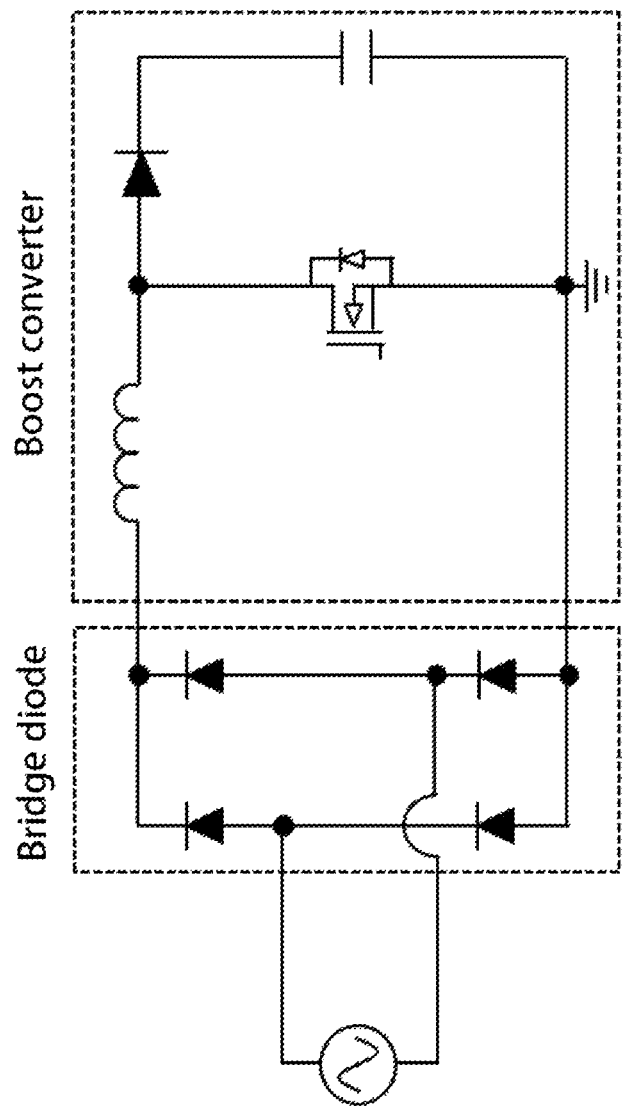
FIGS. 2 to 9D illustrate comparative examples of bridgeless power factor-improving converters according to embodiments of the present invention.

To improve the power factor, the voltage and current of the input AC must be made in phase. In order to improve the power factor, a boost converter as shown in FIG. 2 may be used. At this time, since negative voltage cannot be applied to the input of the boost converter, a bridge diode is used to rectify the AC voltage. The diode of the bridge diode changes its conduction state with the AC voltage frequency (50/60 Hz), and the diode and switch operate at a high frequency (tens of kHz or more). The number of elements located on the current conduction path according to the state of the switch is as follows.

TABLE 1

| State of Switch | Switch | Diode |
|---|---|---|
| On | 1 | 2 |
| Off | 0 | 3 |

Figure 3:
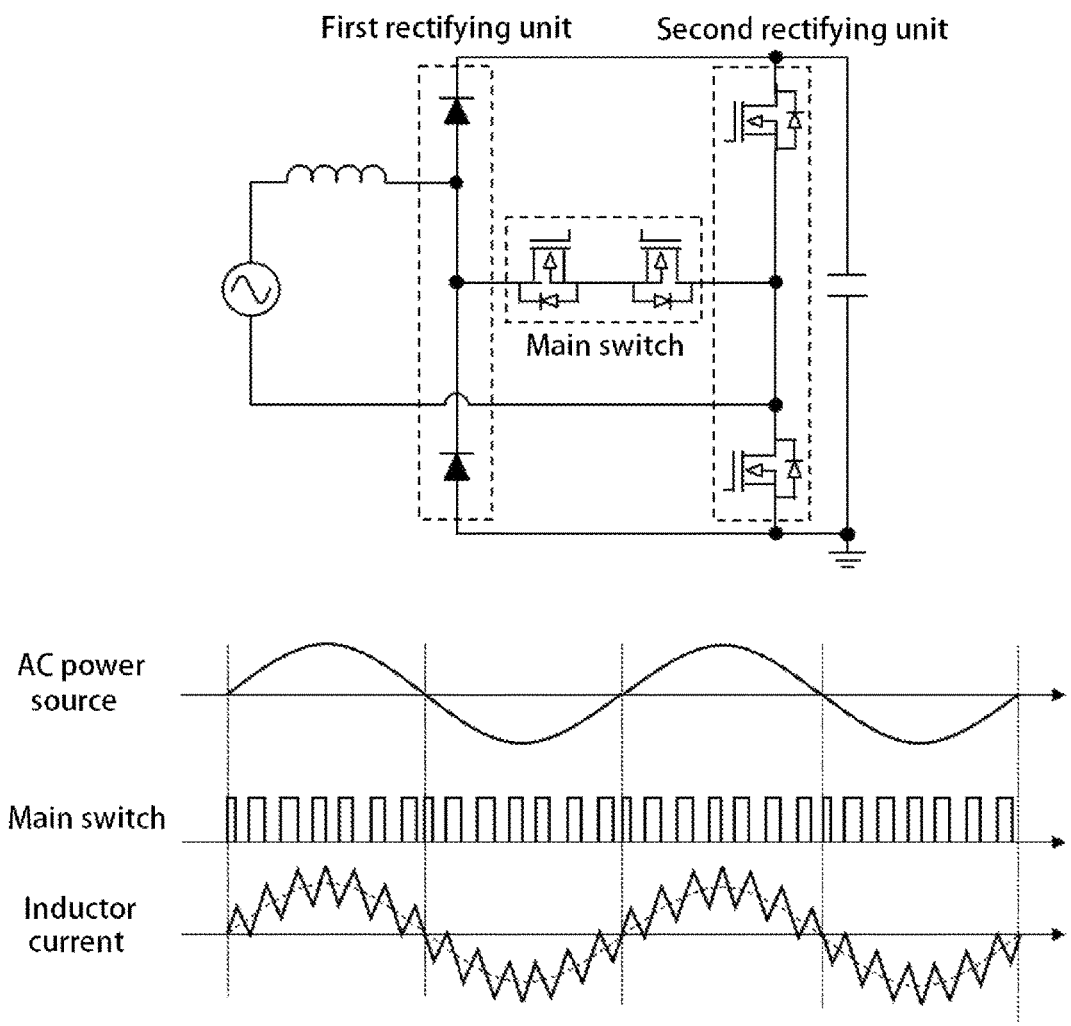
Figure 4B:
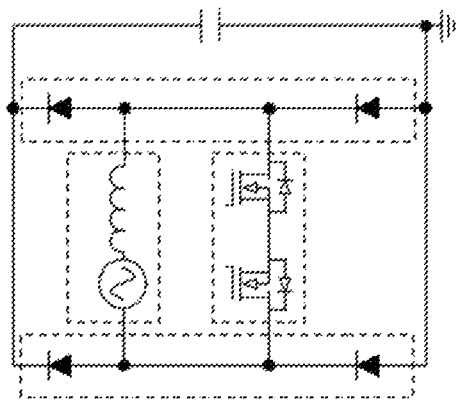
Figure 4A:
Figure 4A:
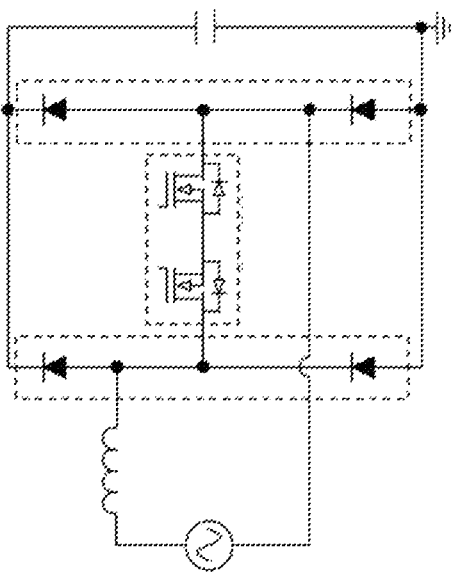

Boost converters have limitations in securing high efficiency due to conduction losses occurring in bridge diodes. FIG. 3 is an example of a bridgeless power factor-improving converter, in which a bridge diode is not used. The circuit of FIG. 3 can be equivalently represented as shown in FIG. 4. It can be seen that the power input unit is directly connected to the first rectifying unit, the main switch, and the second rectifying unit. In the case of using such a converter, when AC power is applied, the power factor can be improved because the current becomes the same as the frequency of the voltage according to the on/off operation of the main switch. In the bridgeless power factor-improving converter of FIG. 3, the number of elements located on the current conduction path according to the state of the switch is as follows.

TABLE 2

| State of Switch | Switch | Diode |
|---|---|---|
| On | 2 | 0 |
| Off | 0 | 2 |

Figure 5:
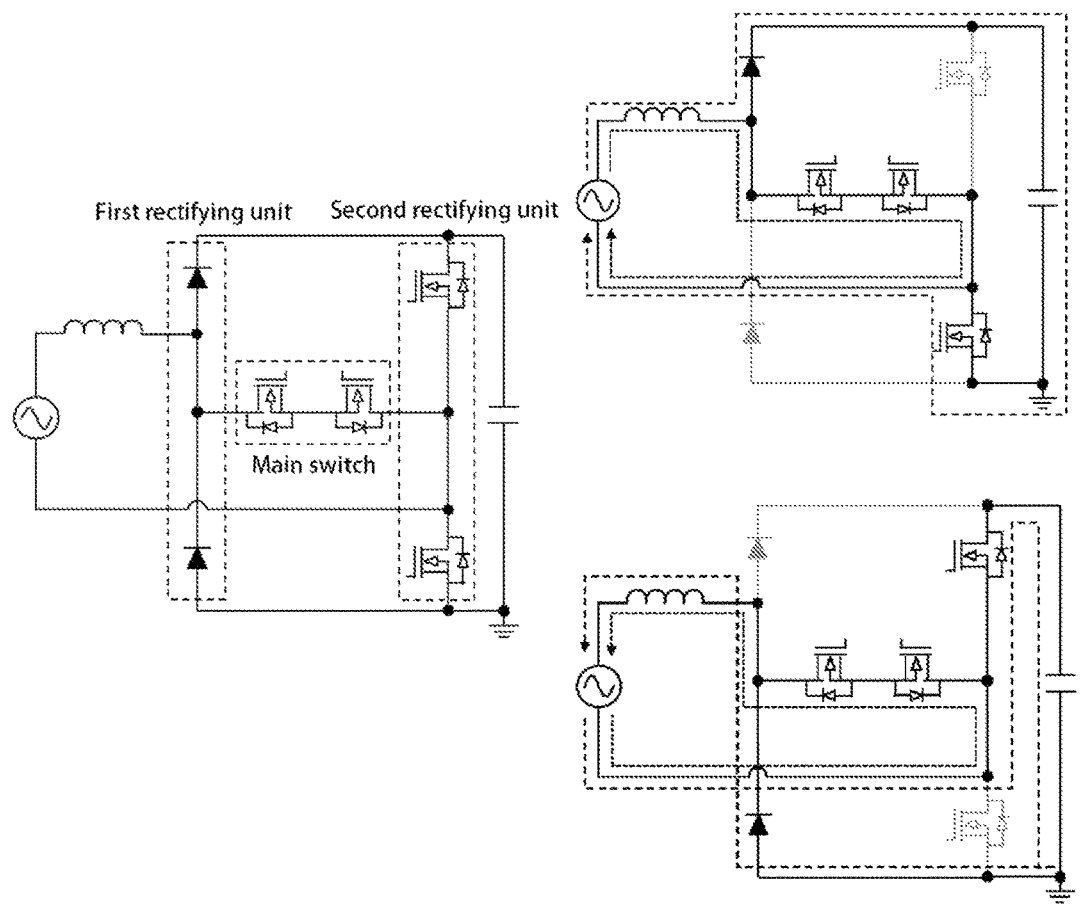

Compared to the boost power factor correction converter of FIG. 2, the number of devices on the current conduction path is reduced, and in particular, the effect of improving efficiency can be expected because the number of diodes is reduced. However, in a state of switch-off, the two diodes are still conducting. In order to reduce the number of conduction diodes when the switch is off, a switch may be applied to the second rectifying unit as shown in FIG. 5. A MOSFET can be used as a switch. In this case, the operation according to the switch state is the same as the case of using the diode as previously described. When the switch is off, it passes through one switch and one diode each. In this way, efficiency improvement can be expected by replacing the diode with a MOSFET having a low Rds.on (on-state drain-source resistance).

TABLE 3

| State of Switch | Switch | Diode |
|---|---|---|
| On | 2 | 0 |
| Off | 1 | 1 |

Figure 6C:
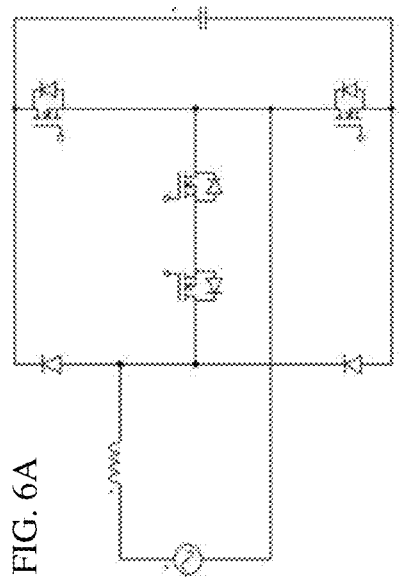
Figure 6D:
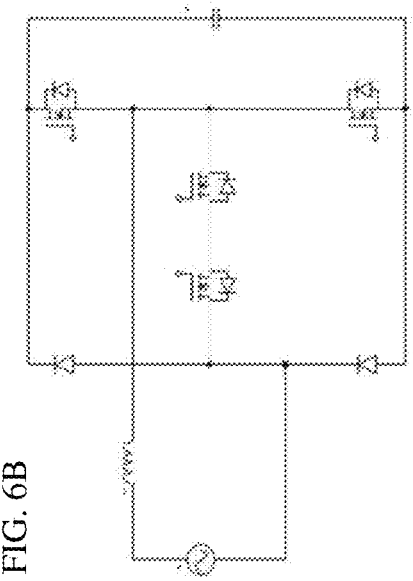
Figure 6A:
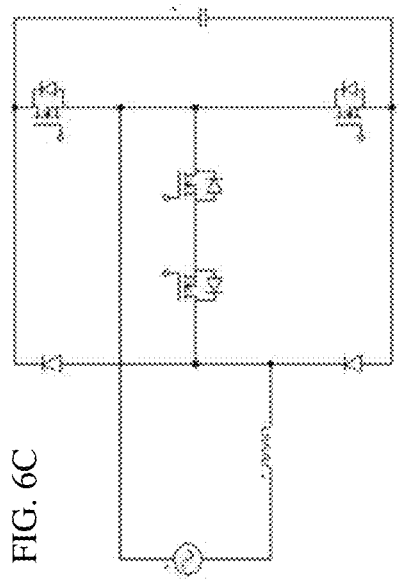
Figure 6B:
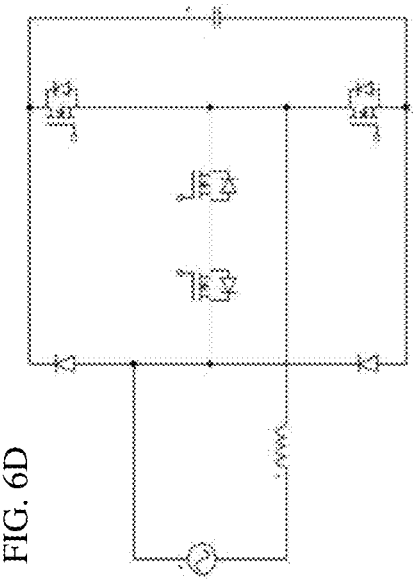

In order to drive the switch included in the converter, a switch driving unit (gate driver), that is, a switch driving circuit is required. Since the switch of the boost PFC converter is located at a low-side, it has the advantage of being easy to implement the power supply and driving circuit included in the switch driving unit with respect to the ground. On the other hand, a bridgeless power factor-improving converter requires a relatively complex switch driving unit because there is a switch that is not located at a low-side, that is, there is a switch being disposed at an upper side. When a switch is applied to the second rectifying unit, it can be configured in various forms as shown in FIG. 6. That is, it may be configured in various forms according to the position of the inductor and the rectifying unit to which the inductor is connected. A device that switches at high speed, such as the first rectifying unit, may generate a relatively large amount of electromagnetic noise. Therefore, as shown in FIG. 6(B) or 6(D), when the first rectifying unit is directly connected to the AC power source, it may be disadvantageous in the aspect of electromagnetic noise (EMI). In order to reduce electromagnetic noise, as shown in FIG. 6(A) or 6(C), it may be implemented in the form of adding an inductor between the AC power source and the first rectifying unit. Since FIGS. 6(A) and 6(C), and 6(B) and 6(D) have different connection positions between the input power and the inductor, the switch of the second rectifying unit that is conducting depending on the polarity of the input power varies. That is, the relation becomes such that the conduction state of the upper and lower switches of the second rectifying unit is reversed.

Figure 7:
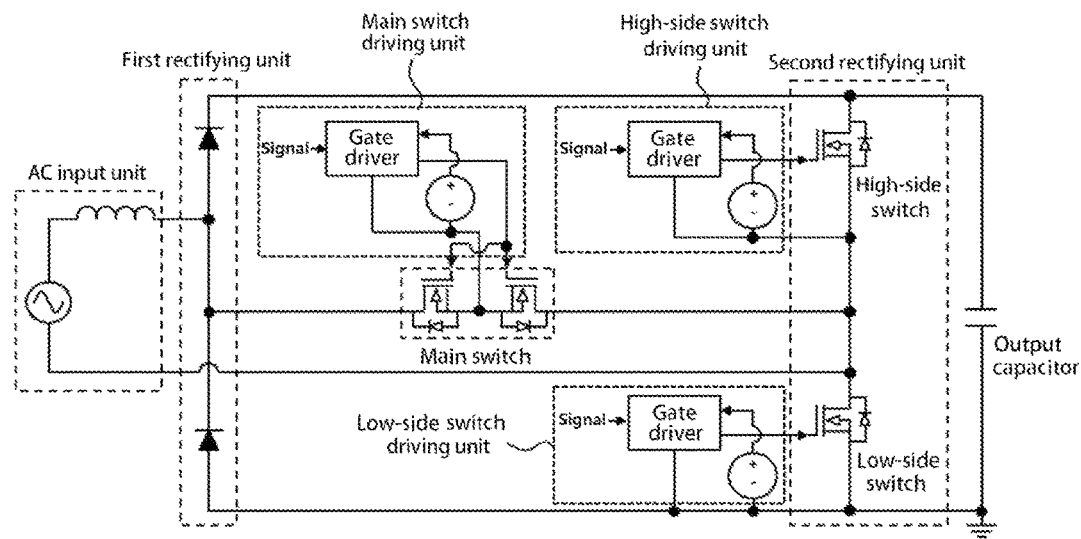

A bridgeless PFC converter including a switch driving unit may be configured as shown in FIG. 7. The two MOSFETs included in the main switch require a switch driving unit with reference to a source terminal, and if the source terminals are disposed to be in contact with each other (common source) there is an advantage in that the two MOSFETs can share one switch driving unit. At this time, power can be generated by a separate converter. The lower switch included in the second rectifying unit is easy to implement because the switch driving unit uses the ground as a reference like a boost converter. At this time, power can be generated by a separate converter or linear regulator.

On the other hand, the high-side switch included in the second rectifying unit requires a switch driving unit with reference to a source terminal of the upper switch. At this time, it can be implemented in various ways of generating power.

First, as shown in FIG. 7, it can be implemented with a separate converter (auxiliary converter). The converter may use an auxiliary converter to generate auxiliary power. Therefore, it can be implemented by generating one more output in the auxiliary converter. However, this has the disadvantage of complicating the auxiliary converter. In addition, switch driving units are required for driving each switch, and three power sources are required to drive the control unit of the switch driving unit.

Figure 8:
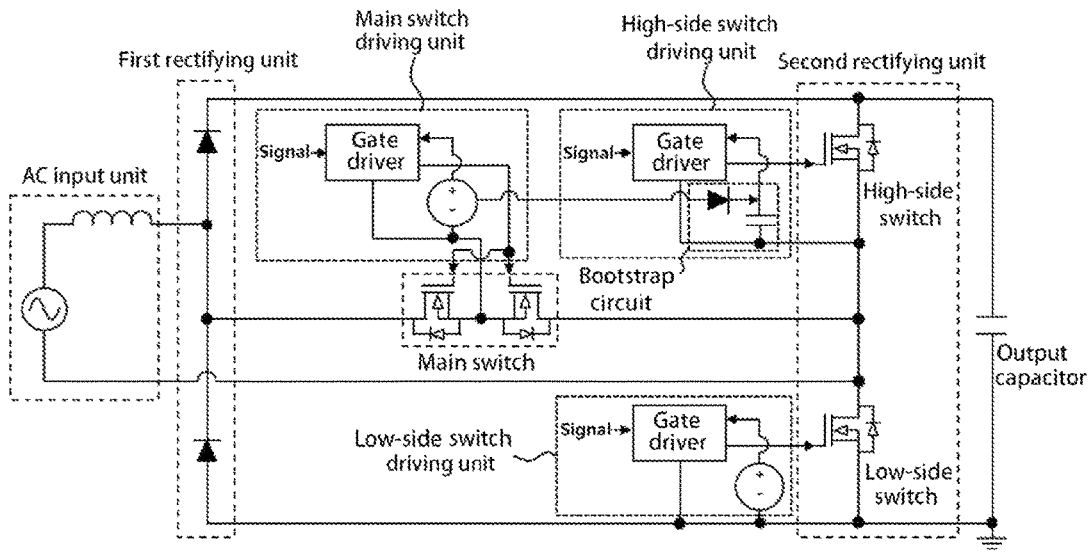

Or, as shown in FIG. 8, a bootstrap circuit may be used. The bootstrap circuit can be used to drive half-bridge switches. It is implemented with one diode and capacitor, and generates power by receiving power from another switch driving unit. This reduces the power required for the switch driving unit to two. When the driving power source of the lower switch is used, the bootstrap circuit charges energy in the capacitor when the lower switch is in an on state, and uses the energy stored in the capacitor when the lower switch is in an off state. Therefore, in order to maintain the voltage of the capacitor, the lower switch must conduct periodically. If the second rectifying unit operates at 50 Hz or 60 Hz in synchronization with the line frequency, the capacitor is charged every few milliseconds. Accordingly, in order for the capacitor to maintain a sufficient power level, there is a disadvantage in that a large capacitor is required compared to the case of operating several kHz.

A bridgeless power factor-improving converter is used to receive AC power and generate DC power, but depending on the user's use, it may be required to operate even when DC power is being inputted. In the case of a boost power factor-improving converter, a bridge diode is used, and the switch is located at a lower side, so that the converter operation is easy even when DC power is applied. However, in the case of a bridgeless power factor-improving converter, the operation is different for DC power wiring. That is, as shown in FIG. 9, the diode and the second rectifying unit switch operating according to the polarity of the DC power supply vary depending on the connection states of the power input unit, the first rectifying unit, the main switch, and the second rectifying unit.

Figure 9C:
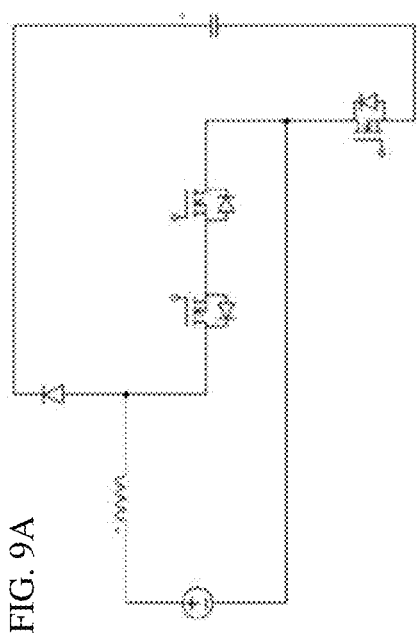
Figure 9D:
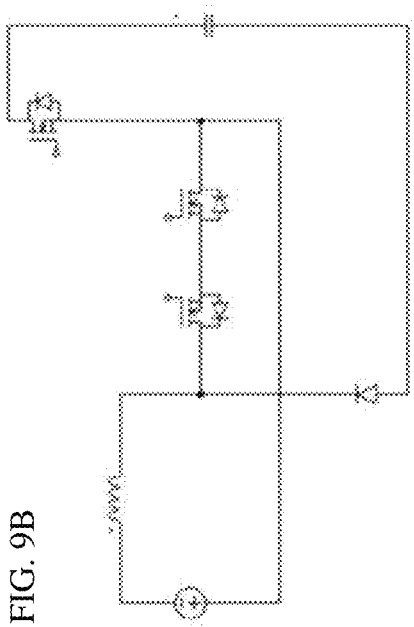
Figure 9A:
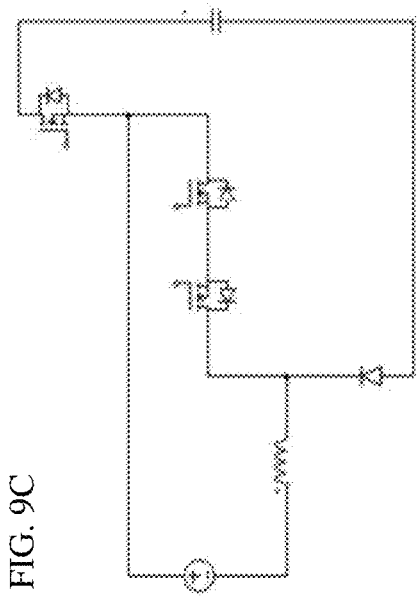
Figure 9B:
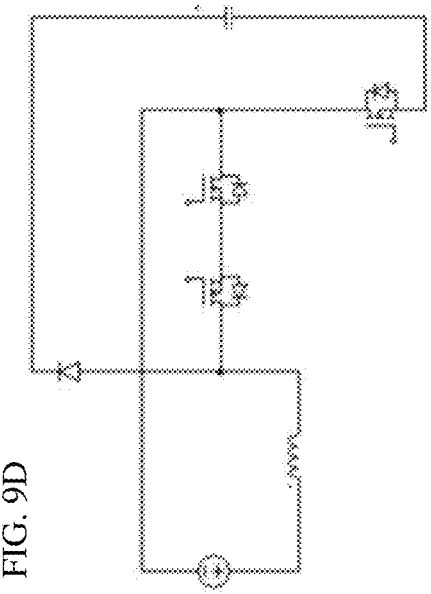

When the inductor is located between the power input unit and the first rectifying unit, when the DC power is positive, the lower switch of second rectifying unit always conducts as shown in FIG. 9(A). At this time, since the lower switch uses the power generated in contrast to the ground, it is possible to maintain a continuous conduction state. As shown in FIG. 9(B), when the DC power supply is negative, the upper switch of the second rectifying unit always conducts. In order to drive the upper switch, power with reference to the source terminal of the corresponding switch is required. At this time, when the bootstrap circuit is used to generate power, the bootstrap circuit is not charged because the lower switch does not conduct. Therefore, in this case, it is difficult to drive the upper switch using the bootstrap circuit. If a bootstrap circuit is used, since it is affected by the conduction state of the lower switch, there may be restrictions on use.

When the inductor is located between the power input unit and the second rectifying unit, when the DC power is positive, the upper switch of the second rectifying unit always conducts as shown in FIG. 9(C). In order to drive the upper switch, power with reference to the source terminal of the corresponding switch is required. At this time, when the bootstrap circuit is used to generate power, the bootstrap circuit is not charged because the lower switch does not conduct. Therefore, in this case, it is difficult to drive the upper switch using the bootstrap circuit. If a bootstrap circuit is used, since it is affected by the conduction state of the lower switch, there may be restrictions on use. As shown in FIG. 9(D), when the DC power is negative, the lower switch of the second rectifying unit always conducts. At this time, since the lower switch uses the power generated in contrast to the ground, it is possible to maintain a continuous conduction state.

In the bridgeless power factor-improving converter 100 according to an embodiment of the present invention, since the second upper switch of the second rectifying unit 130 is connected to the driving power source 150 included in the switch driving unit for driving the power factor-improving switch unit 140, implementation of auxiliary converters that generate auxiliary power is simplified. In addition, since the bootstrap circuit receives power from the main switch driving unit and operates, making it independent of the conduction state of the second lower switch of the second rectifying unit 130, it is easy to use the second rectifying unit 130 at line frequency or use a bridgeless power factor-improving converter in a DC power supply situation. In addition, by configuring the bootstrap circuit by receiving the driving power source 150 of the switch driving unit that drives the power factor-improving switch unit 140, it may be affected by the conduction state of the main switch, but in the case where the power factor-improving switch unit 140 does not switch is when 1) the bridgeless power factor-improving converter itself does not operate, or 2) when the bridgeless power factor-improving converter is unloaded, and in this condition, since the second rectifying unit 130 does not have to operate, there is no problem.

Figure 10:
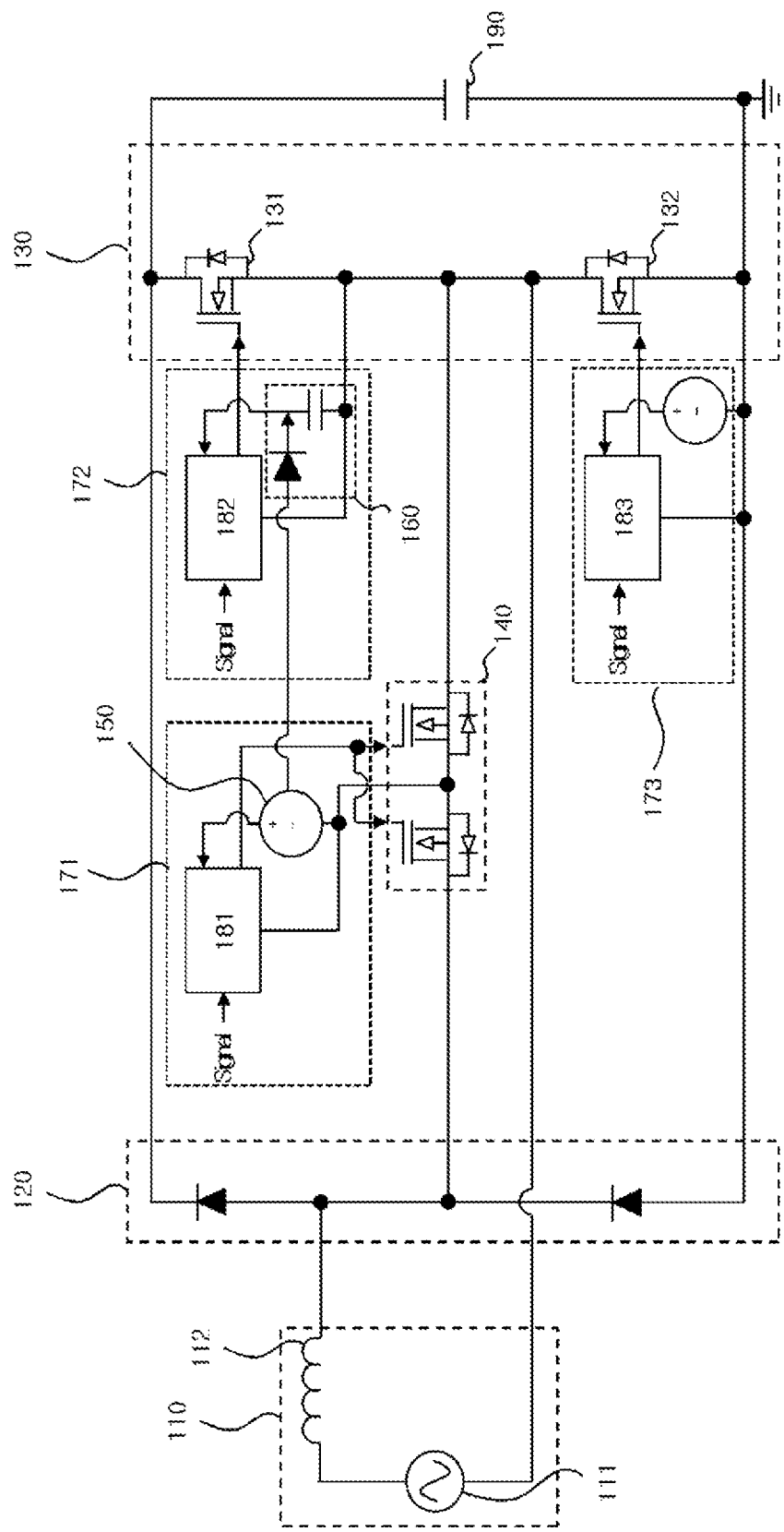
FIG. 10 is an exemplary circuit diagram of a bridgeless power factor-improving converter according to an embodiment of the present invention.

FIG. 10 is an exemplary circuit diagram of a bridgeless power factor-improving converter according to an embodiment of the present invention.

It is configured with: a power input unit 110; a first rectifying unit 120; a second rectifying unit 130; and a power factor-improving switch unit 140, and includes: a first switch driving unit 171 for driving the power factor-improving switch unit 140; a second switch driving unit 172 for driving the second upper switch 131 of the second rectifying unit 130; and a third switch driving unit 173 for driving the second lower switch 132 of the second rectifying unit 130, wherein the second switch driving unit 172 may receive power from the driving power source 150 of the first switch driving unit 171. The power input unit 110 may include a power supply unit 111 and an inductor 112, and an output capacitor 190 may be connected to an output terminal.

According to the embodiment, when the power factor-improving switch unit 140 is conducting, energy is stored in the inductor 112 of the power input unit 110, and when the power factor-improving switch unit 140 does not conduct, the diode included in the first rectifying unit 120 conducts and transfers the energy stored in the inductor 112 to the output capacitor 190. At this time, the current of the inductor 112 and the voltage of the output capacitor 190 can be controlled by adjusting the duty cycle of the power factor-improving switch unit 140. Switch driving units 171, 172, and 173 being connected to each switch control the conduction state of the corresponding switches 140, 131, and 132 according to the signals being inputted thereto.

The power factor-improving switch unit 140 may include two MOSFET switches whose sources are connected to each other. The first switch driving unit 171 may include: a control unit 181 for controlling the gate voltage of the two MOSFET switches of the power factor-improving switch unit 140; and a driving power source 150 for supplying power to the control unit 181. In detail, one driving power source 150 of the first switch driving unit 171 is connected to the sources of two MOSFETs of the power factor-improving switch unit 140, and gate voltages of two MOSFET switches of the power factor-improving switch unit 140 can be simultaneously controlled through the control unit 181.

The first rectifying unit 120 includes an upper diode and a lower diode, wherein one end of the power factor-improving switch unit 140 is connected to a node between the upper and lower diodes, and the other end may be connected to a node between the second upper switch 131 and the second lower switch 132.

The second switch driving unit 172 may be configured with a control unit 182 for controlling the gate voltage of the second upper switch 131 and a bootstrap circuit unit 160 for receiving power from the driving power source 150 of the first switch driving unit 171 and supplying power to the control unit 182.

Figure 11:
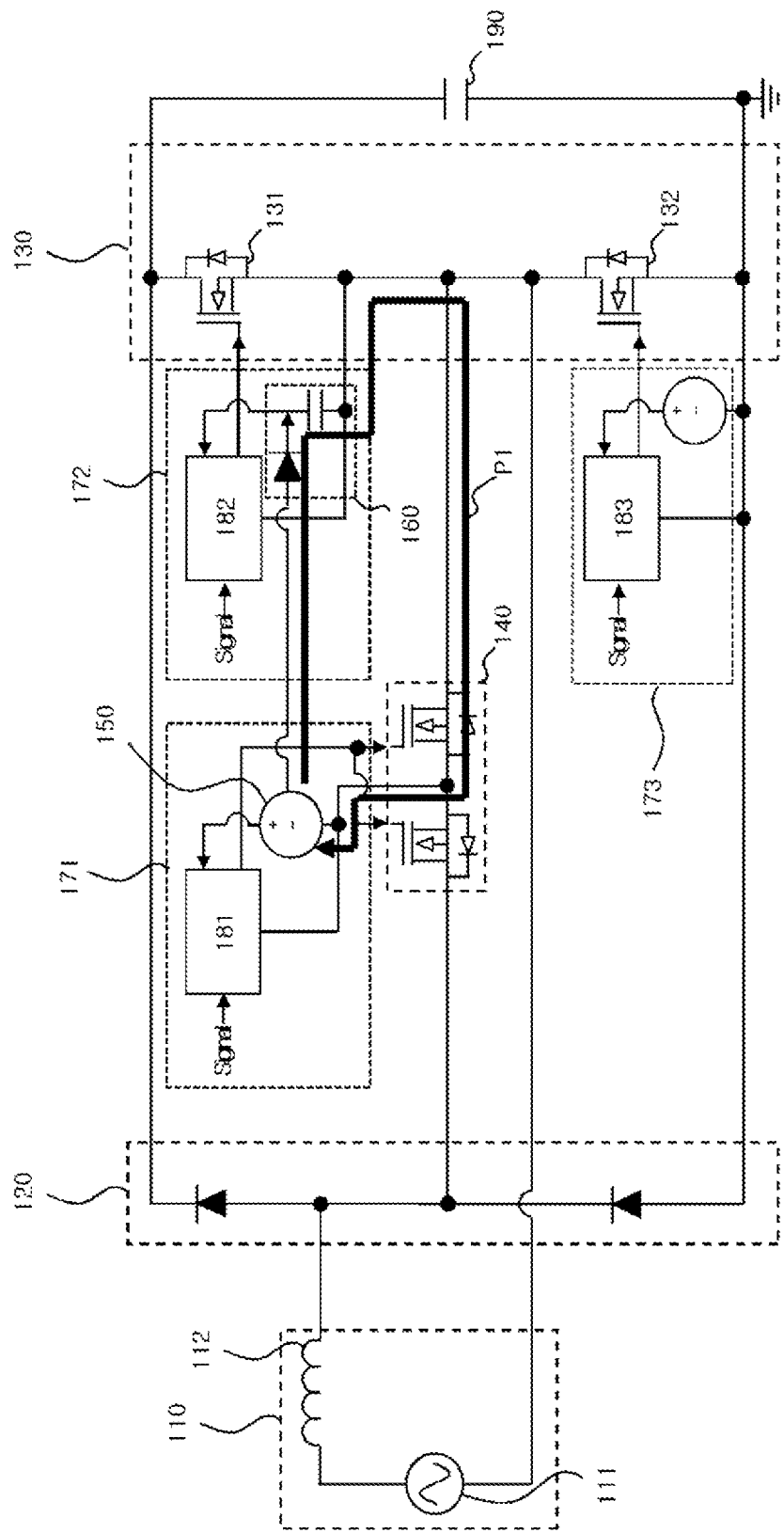
FIGS. 11 and 12 are views for explaining a power factor correction converter according to an embodiment of the present invention.

The bootstrap circuit unit 160 may be configured with a diode and a capacitor being connected to the driving power source 150 of the first switch driving unit 171. One end of the capacitor of the bootstrap circuit unit 160 is connected to the control unit 182 and the other end is connected to the source of the MOSFET switch, which is the second upper switch 131; and the anode of the diode of the bootstrap circuit unit 160 is connected to the driving power source 150 of the first switch driving unit 171, and the cathode may be connected to a node between the capacitor and the control unit 182. In the bootstrap circuit unit 160 formed as described above, when the power factor-improving switch unit 140 is turned on, a P1 path is formed as shown in FIG. 11 to receive power from the driving power source 150 and charge the capacitor; and when the power factor-improving switch unit 140 is turned off, the control unit 182 can be driven using the energy charged in the capacitor. A resistor may be used in series with the diode to limit the current that flows when the capacitor is charging.

In this way, as the bootstrap circuit unit 160 is connected to the driving power source 150 of the first switch driving unit 171, there is no limitation in use compared to the case of using the switch driving unit of the lower switch (second lower switch, 132).

The control units 181, 182, and 183 may include an isolation function to isolate signals. In addition, a separate power circuit may be included to generate power for the switch driving units 171, 172, and 173. For example, the power circuit may use a linear regulator, an isolated or non-isolated converter, and the like.

Figure 12:
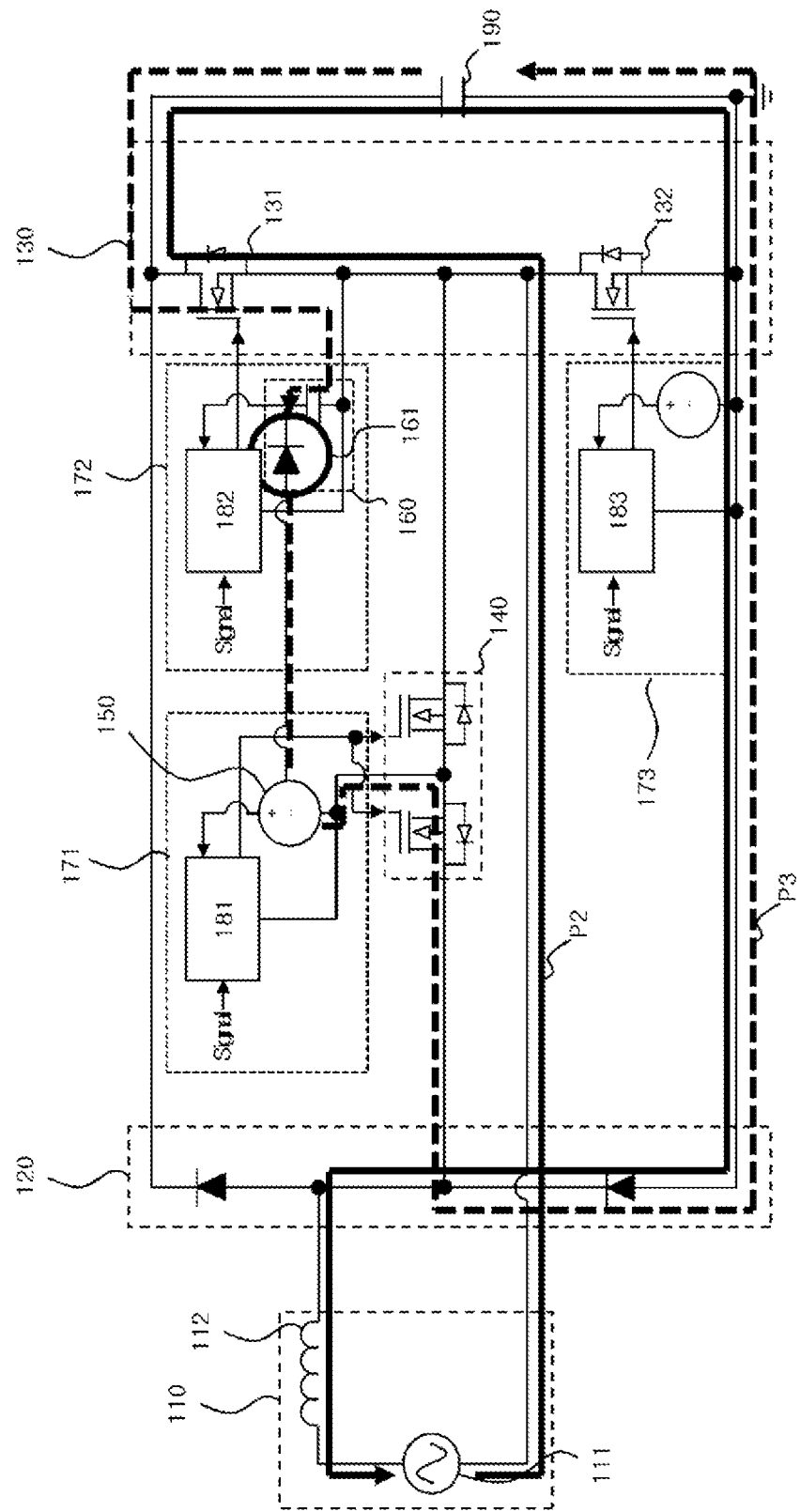

As shown in FIG. 12, the diode 161 of the bootstrap circuit unit 160 may block reverse voltage in a situation where the output voltage is reversely applied. The path P2 is the current path of the bridgeless power factor-improving converter, and the path P3 is the reverse voltage path of the bootstrap. The reverse voltage path of the bootstrap can be blocked using the diode 161 of the bootstrap circuit unit 160. To this end, it is necessary to use a diode 161 having a breakdown voltage higher than the output voltage.

Figure 13:
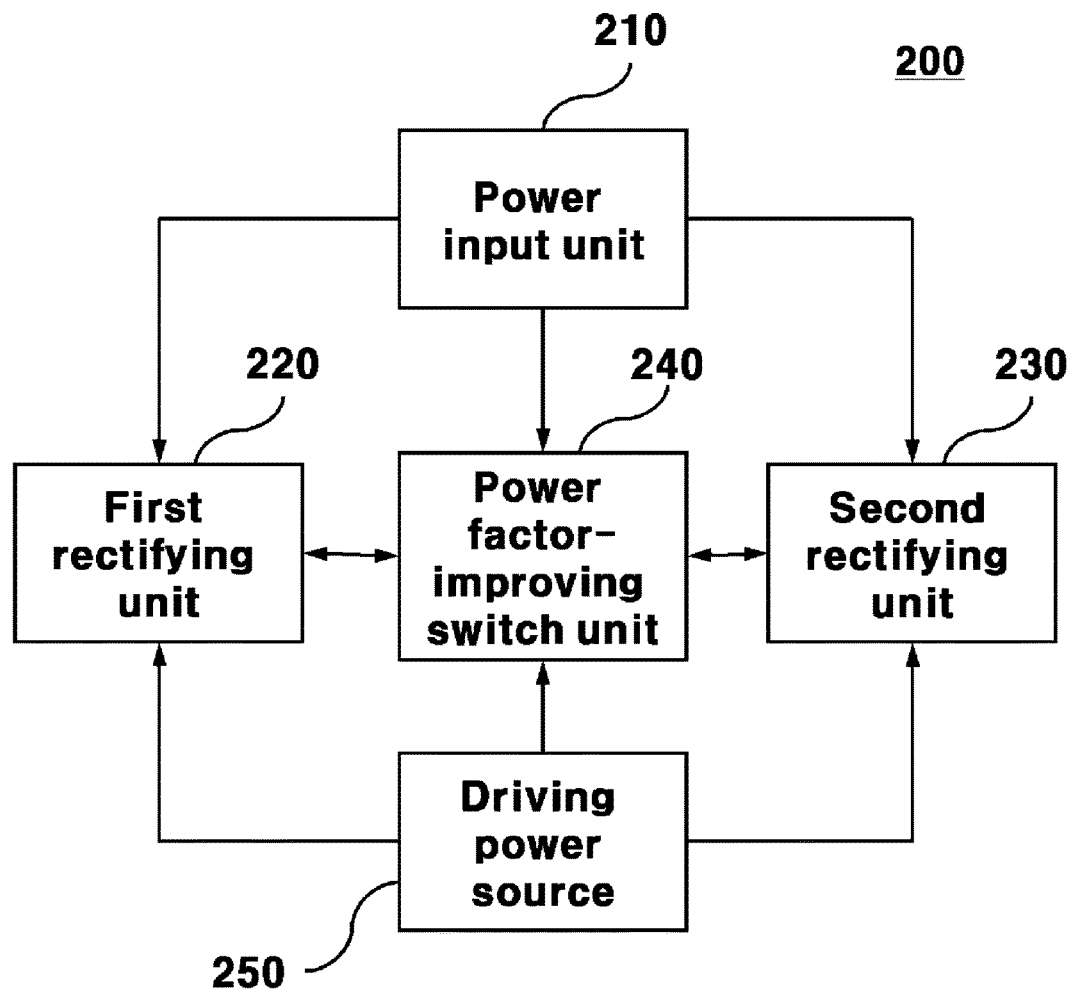
FIG. 13 is a block diagram of a bridgeless power factor-improving converter according to another embodiment of the present invention.
Figure 14:
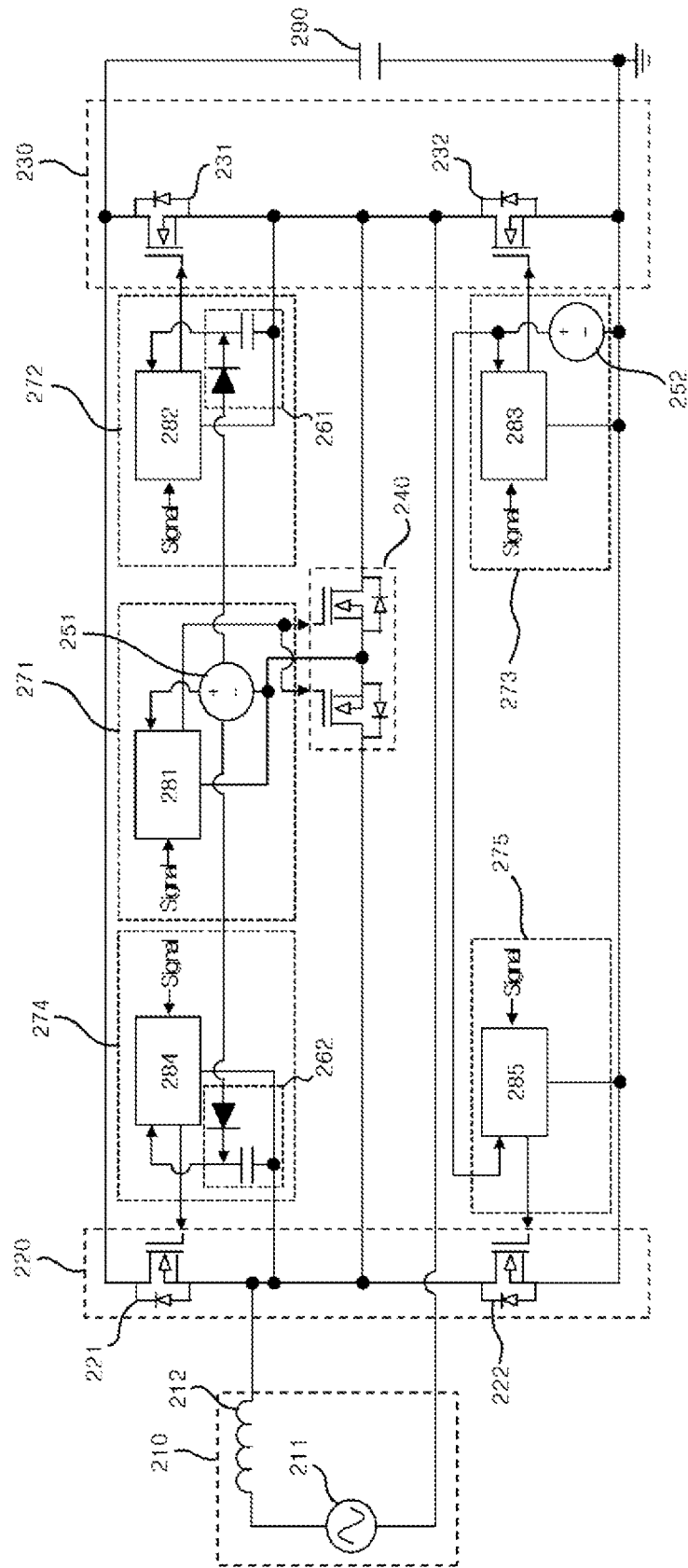
FIG. 14 is an exemplary circuit diagram of a bridgeless power factor-improving converter according to another embodiment of the present invention.

FIG. 13 is a block diagram of a bridgeless power factor-improving converter according to another embodiment of the present invention; and FIG. 14 is an exemplary circuit diagram of a bridgeless power factor-improving converter according to another embodiment of the present invention. Among the detailed descriptions of the bridgeless power factor-improving converter according to another embodiment of the present invention of FIGS. 13 and 14, the descriptions being overlapped with the parts corresponding to the detailed description of the bridgeless power factor-improving converter of FIGS. 1 to 12 will be omitted.

A bridgeless power factor-improving converter 200 according to another embodiment of the present invention comprises: a power input unit 210 for receiving a power; a first rectifying unit 220 and a second rectifying unit 230 for rectifying the power being received; a power factor-improving switch unit 240 being connected to the first rectifying unit 220 and the second rectifying unit 230 for improving the power factor according to the on/off operation, wherein the first rectifying unit 220 includes a first upper switch 221 and a first lower switch 222, wherein the second rectifying unit 230 includes a second upper switch 231 and a second lower switch 232, and wherein the first upper switch 221 and the second upper switch 231 may be driven by a driving power source 251 connected to a control unit 281 for controlling the driving of the power factor-improving switch unit 240. Here, the first lower switch 222 may be driven by being connected to a driving power source 252 connected to a control unit 283 for controlling the driving of the second lower switch 232.

The first rectifying unit 220 of a bridgeless power factor-improving converter 200 according to another embodiment of the present invention may be configured with a switch rather than a diode. That is, the first rectifying unit 220 is configured with a first upper switch 221 and a first lower switch 222 to be corresponding to the second rectifying unit 230, and the first upper switch 221 may be driven by being connected to the driving power source 251 of the first switch driving unit 271 for controlling the driving of the power factor-improving switch unit 240. Through this, a driving power source for driving the upper switches 221 and 231 of the first rectifying unit 220 and the second rectifying unit 230 can be reduced. In addition, the first lower switch 222 may be driven by being connected to the driving power source 252 of the third switch driving unit 273 controlling the driving of the second lower switch 232. Through this, a driving power source for driving the lower switch (first lower switch 222) of the first rectifying unit 220 can be reduced. That is, by using only two driving power sources 251 and 252, the power factor-improving switch unit 240, first upper switch 221, the first lower switch 222, the second upper switch 231, and second lower switch 232 can be driven.

In detail, the power factor-improving switch unit 230 may be controlled by a control unit 281 being driven by a driving power source 251 included in the first switch driving unit 271. The first upper switch 221 may be controlled by a fourth switch driving unit 274, and the fourth switch driving unit 274 may include a control unit 284 for controlling the gate voltage of the first upper switch 221 and a bootstrap circuit unit 262 for receiving power from the driving power source 251 of the first switch driving unit 171 and supplying power to the control unit 284. Likewise, the second upper switch 231 may be controlled by the second switch driving unit 272, and the second switch driving unit 272 may include a control unit 282 for controlling the gate voltage of the second upper switch 231 and a bootstrap circuit unit 262 for receiving power from the driving power source 251 of the first switch driving unit 171 and supplying power to the control unit 282.

Figure 15:
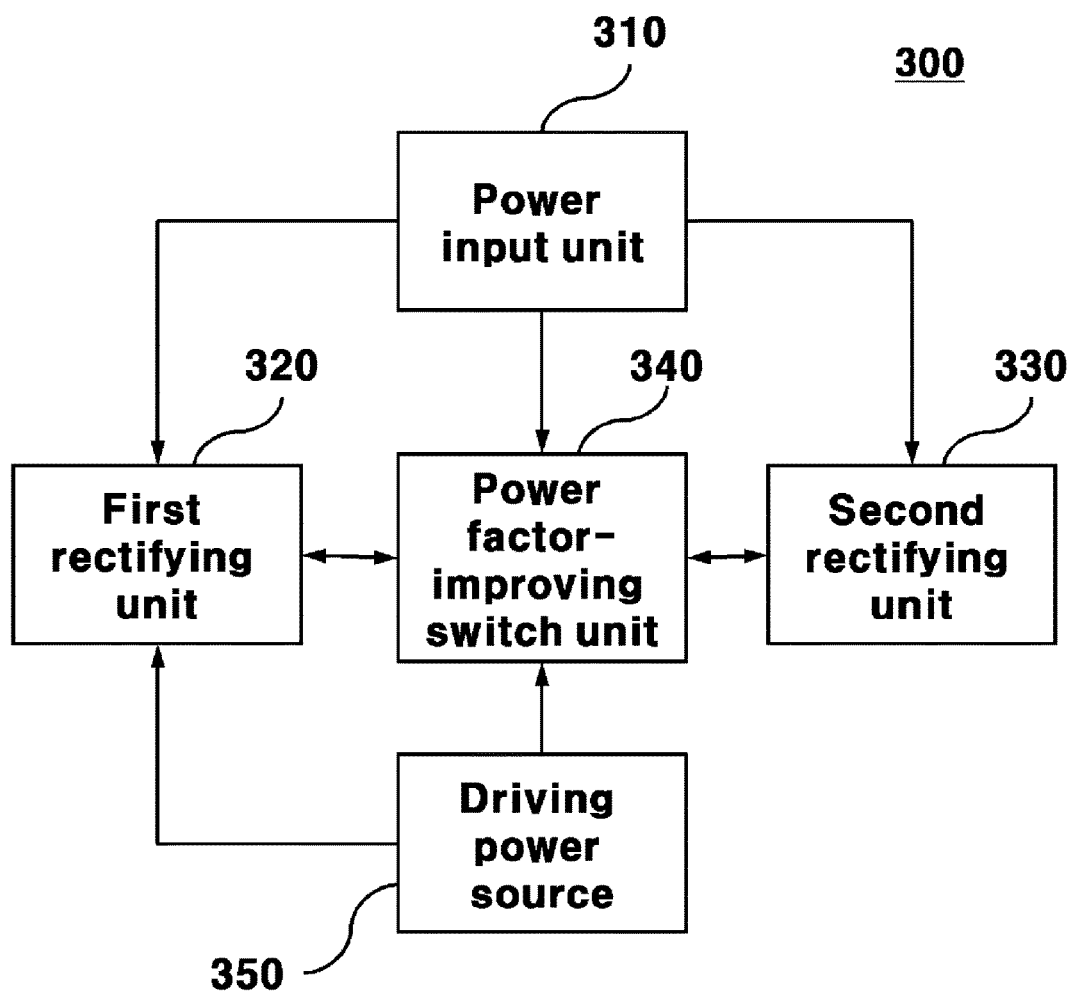
FIG. 15 is a block diagram of a bridgeless power factor-improving converter according to another embodiment of the present invention.
Figure 16:
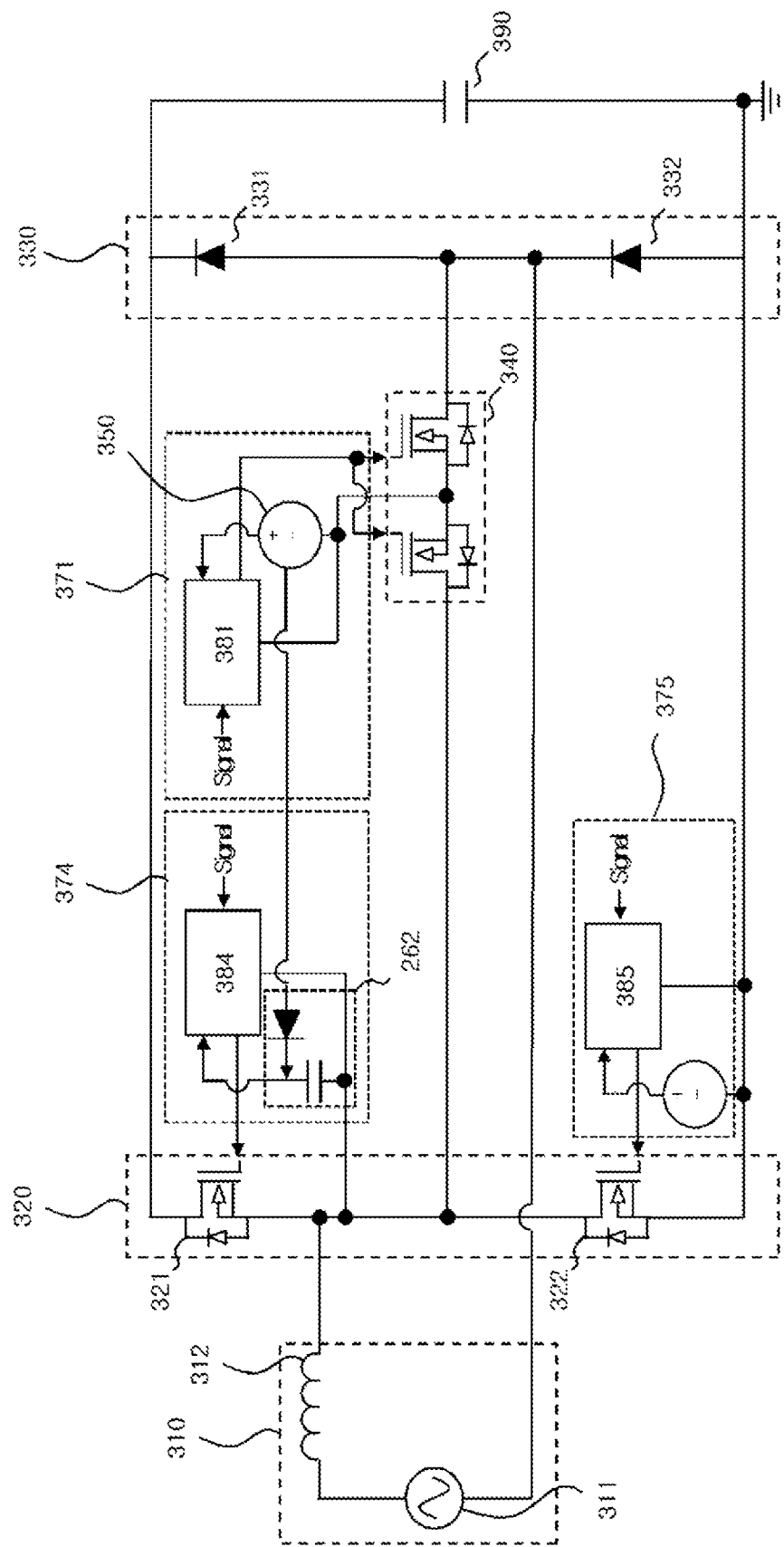
FIG. 16 is an exemplary circuit diagram of a bridgeless power factor-improving converter according to another embodiment of the present invention.

FIG. 15 is a block diagram of a bridgeless power factor-improving converter according to another embodiment of the present invention; and FIG. 16 is an exemplary circuit diagram of a bridgeless power factor-improving converter according to another embodiment of the present invention. Among the detailed descriptions of the bridgeless power factor-improving converter according to another embodiment of the present invention of FIGS. 15 and 16, the descriptions being overlapped with the parts corresponding to the detailed description of the bridgeless power factor-improving converter of FIGS. 1 to 14 will be omitted.

A bridgeless power factor-improving converter 300 according to yet another embodiment of the present invention comprises: a power input unit 310 for receiving a power; a power factor-improving switch unit 340 being connected to the first rectifying unit 320 the second rectifying unit 330 for rectifying the power being inputted, and improving the power factor according to the on/off operation by being connected to the first rectifying unit 320 and the second rectifying unit 330, wherein the first rectifying unit 320 includes a first upper switch 321 and a first lower switch 322, wherein the first upper switch 321 is driven by being connected to the driving power source 350 of the first switch driving unit 371 including the control unit 381 for controlling the driving of the power factor-improving switch unit 340. In a bridgeless power factor-improving converter 300 according to still yet another embodiment of the present invention, the first rectifying unit 320 is configured with a first upper switch 321 and a first lower switch 322, and the second rectifying unit 330 may be configured with an upper diode 331 and a lower diode 332. At this time, the first upper switch 321 is driven by being connected to the driving power source 350 of the first switch driving unit 371 for controlling the driving of the power factor-improving switch unit 340, thereby possibly reducing the driving power source for driving the first upper switch 321.

Those skilled in the art related to this embodiment will be able to understand that it can be implemented in a modified form within the scope that does not deviate from the essential characteristics of the above description. Therefore, the disclosed methods are to be considered in an illustrative rather than a limiting sense. The scope of the present invention is shown in the claims rather than the foregoing description, and all differences within the equivalent scope will be construed as being included in the present invention.

The invention claimed is:

1. A bridgeless power factor-improving converter comprising:
   a power input unit configured to receive a power;
   a first rectifying unit and a second rectifying unit configured to rectify the power received; and
   a power factor-improving switch unit connected to the first rectifying unit and the second rectifying unit and configured to improve a power factor according to an on/off operation,
   wherein the second rectifying unit comprises a second upper switch and a second lower switch, and
   wherein the second upper switch is driven by being connected to a driving power source of the power factor-improving switch unit.

2. The bridgeless power factor-improving converter according to claim 1, comprising:
   a first switch driving unit configured to drive the power factor-improving switch unit;
   a second switch driving unit configured to drive the second upper switch; and
   a third switch driving unit configured to drive the second lower switch,
   wherein the second switch driving unit receives a power from the driving power source of the first switch driving unit.

3. The bridgeless power factor-improving converter according to claim 2, wherein the second switch driving unit comprises:
   a control unit configured to control a gate voltage of the second upper switch; and
   a bootstrap circuit unit configured to receive a power from the driving power source of the first switch driving unit and supplying the power to the control unit.

4. The bridgeless power factor-improving converter according to claim 3, wherein the bootstrap circuit unit comprises a diode and a capacitor connected to the driving power source of the first switch driving unit.

5. The bridgeless power factor-improving converter according to claim 4, wherein one end of the capacitor of the bootstrap circuit unit is connected to the control unit and another end of the capacitor of the bootstrap circuit unit is connected to a source of a MOSFET switch, which is the second upper switch, and
   wherein an anode of the diode of the bootstrap circuit unit is connected to the driving power source of the first switch driving unit and a cathode is connected to a node between the capacitor and the control unit.

6. The bridgeless power factor-improving converter according to claim 1, wherein the power factor-improving switch unit comprises two MOSFET switches whose sources are connected to each other.

7. The bridgeless power factor-improving converter according to claim 6, wherein the sources of the two MOSFET switches of the power factor-improving switch unit are connected to the driving power source of the power factor-improving switch unit.

8. The bridgeless power factor-improving converter according to claim 1, wherein the first rectifying unit comprises an upper diode and a lower diode, and
   wherein one end of the power factor-improving switch unit is connected to a node between the upper diode and the lower diode and another end of the power factor-improving switch unit is connected to a node between the second upper switch and the second lower switch.

9. The bridgeless power factor-improving converter according to claim 1, wherein the power input unit receives AC power or DC power.

10. The bridgeless power factor-improving converter according to claim 1, wherein the power input unit comprises an inductor.

11. The bridgeless power factor-improving converter according to claim 1, comprising:
    an output capacitor connected to output ends of the first rectifying unit and the second rectifying unit.

12. A bridgeless power factor-improving converter, comprising:
    a power input unit configured to receive a power;
    a first rectifying unit and a second rectifying unit configured to rectify the power received; and
    a power factor-improving switch unit connected to the first rectifying unit and the second rectifying unit and configured to improve a power factor according to an on/off operation,
    wherein the first rectifying unit comprises a first upper switch and a first lower switch,
    wherein the second rectifying unit comprises a second upper switch and a second lower switch, and
    wherein the first upper switch and the second upper switch are connected to and driven by a driving power source of the power factor-improving switch unit.

13. The bridgeless power factor-improving converter according to claim 12, wherein the first lower switch is driven by being connected to the driving power source of the second lower switch.

14. The bridgeless power factor-improving converter according to claim 12, comprising:
    a first switch driving unit configured to drive the power factor-improving switch unit;
    a second switch driving unit configured to drive the second upper switch; and
    a third switch driving unit configured to drive the second lower switch, wherein the second switch driving unit receives a power from the driving power source of the first switch driving unit.

15. The bridgeless power factor-improving converter according to claim 14, wherein the second switch driving unit comprises:
a control unit configured to control a gate voltage of the second upper switch; and
a bootstrap circuit unit configured to receive a power from the driving power source of the first switch driving unit and supplying the power to the control unit.

16. The bridgeless power factor-improving converter according to claim 15, wherein the bootstrap circuit unit comprises a diode and a capacitor connected to the driving power source of the first switch driving unit.

17. The bridgeless power factor-improving converter according to claim 16, wherein one end of the capacitor of the bootstrap circuit unit is connected to the control unit and another end of the capacitor of the bootstrap circuit unit is connected to a source of a MOSFET switch, which is the second upper switch, and
wherein an anode of the diode of the bootstrap circuit unit is connected to the driving power source of the first switch driving unit and a cathode is connected to a node between the capacitor and the control unit.

18. The bridgeless power factor-improving converter according to claim 12, wherein the power factor-improving switch unit comprises two MOSFET switches whose sources are connected to each other.

19. The bridgeless power factor-improving converter according to claim 18, wherein the sources of the two MOSFET switches of the power factor-improving switch unit are connected to the driving power source of the power factor-improving switch unit.

20. A bridgeless power factor-improving converter, comprising:
a power input unit configured to receive a power;
a first rectifying unit and a second rectifying unit configured to rectify the power received; and
a power factor-improving switch unit connected to the first rectifying unit and the second rectifying unit and configured to improve a power factor according to an on/off operation,
wherein the first rectifying unit comprises a first upper switch and a first lower switch,
wherein the first upper switch is connected to and driven by a driving power source of the power factor-improving switch unit.

* * * * *